United States Patent [19]
Nagato

[11] Patent Number: 5,400,321
[45] Date of Patent: Mar. 21, 1995

[54] CENTRAL MONITORING SYSTEM OF A MULTIPLEX SUBSCRIBER LOOP CARRIER

[75] Inventor: Takashi Nagato, Kawasaki, Japan

[73] Assignee: Fujitsu Limited, Kawasaki, Japan

[21] Appl. No.: 85,966

[22] Filed: Jun. 30, 1993

[30] Foreign Application Priority Data

Jun. 30, 1992 [JP] Japan .................. 4-196109

[51] Int. Cl.$^6$ .................. H04J 1/16; H04J 3/14
[52] U.S. Cl. .................. 370/14; 379/27
[58] Field of Search .................. 370/13, 14, 54, 58, 370/63, 59, 70; 379/27, 29, 30, 33

[56] References Cited

U.S. PATENT DOCUMENTS

| | | | |
|---|---|---|---|
| 4,393,490 | 7/1983 | Culley | 370/13 |
| 4,424,421 | 1/1984 | Townsend et al. | 370/14 |
| 4,575,839 | 3/1986 | Ogata et al. | 370/13 |
| 4,821,256 | 4/1989 | Schmidt et al. | 370/14 |
| 4,845,711 | 7/1989 | LeFort et al. | 370/13 |
| 4,878,048 | 10/1989 | Gottesman et al. | 370/14 |
| 5,239,537 | 8/1993 | Sakauchi | 370/13 |

FOREIGN PATENT DOCUMENTS

| | | |
|---|---|---|
| 57-152266 | 9/1982 | Japan . |
| 60-018051 | 1/1985 | Japan . |
| 61-200752 | 9/1986 | Japan . |
| 2064270 | 6/1981 | United Kingdom . |
| 8602796 | 5/1986 | WIPO . |
| 8603357 | 6/1986 | WIPO . |
| 9204794 | 3/1992 | WIPO . |

OTHER PUBLICATIONS

"Loop Test System: A New Maintenance Feature for the Distributed Integrated Digital Network", Clark et al., IEEE, vol. COM-29, No. 10, Oct. 1981, pp. 1419-1428.

"Maintenance and Administration System for DTS-21 Digital Local Switching System", Yokota, et al., Review of Electrical Communication Laboratories, vol. 31, No. 1, (1983).

"A New Approach to Testing Loops Served by Pair Gain Systems", Swanson, IEEE, 1979, pp. 51.6.1-51.6.5.

Primary Examiner—Douglas W. Olms
Assistant Examiner—Ajit Patel

[57] ABSTRACT

A central monitoring system of a multiplex subscriber loop carrier has a remote terminal which includes a first subscriber line tester for testing first subscriber lines connected to subscriber terminals so as to detect a fault on a first subscriber line and outputting an alarm if the fault is detected. A central office terminal is connected to the remote terminal via a carrier line and to a local switch via second subscriber lines. The central office terminal includes a dummy fault generating circuit which represents the fault. Upon receiving the alarm via the carrier line, the dummy fault generating circuit is connected via a transfer switch to one of the second subscriber lines which corresponds to the first subscriber line having the fault thereon. Then, a second subscriber line tester provided in the local switch for testing the second subscriber lines detects the dummy fault generating circuit to provide a message informing that the fault is on the first subscriber line which corresponds to the second subscriber line having the dummy fault generating circuit connected thereto.

6 Claims, 6 Drawing Sheets

PRIOR ART
FIG. 1

| ITEM TO TEST \ WHERE TO TEST | BETWEEN LINES a AND b | BETWEEN LINE a AND GROUND | BETWEEN LINE b AND GROUND |
|---|---|---|---|
| DC VOLTAGE | 8 v max | 8 v max | 8 v max |
| AC VOLTAGE | 8 v max | 8 v max | 8 v max |
| INSULATION | 100 kΩ min | 100 kΩ min | 100 kΩ min |
| CAPACITANCE | 0.4 µF max | 0.4 µF min | 0.4 µF min |

CENTRAL MONITORING SYSTEM OF A MULTIPLEX SUBSCRIBER LOOP CARRIER

BACKGROUND OF THE INVENTION

1. Field of the Invention

This invention relates to a central monitoring system that can monitor at a local switch an occurrence of a fault on a subscriber line connected via a subscriber loop carrier to the local switch.

2. Description of the Related Arts

Figure 1:
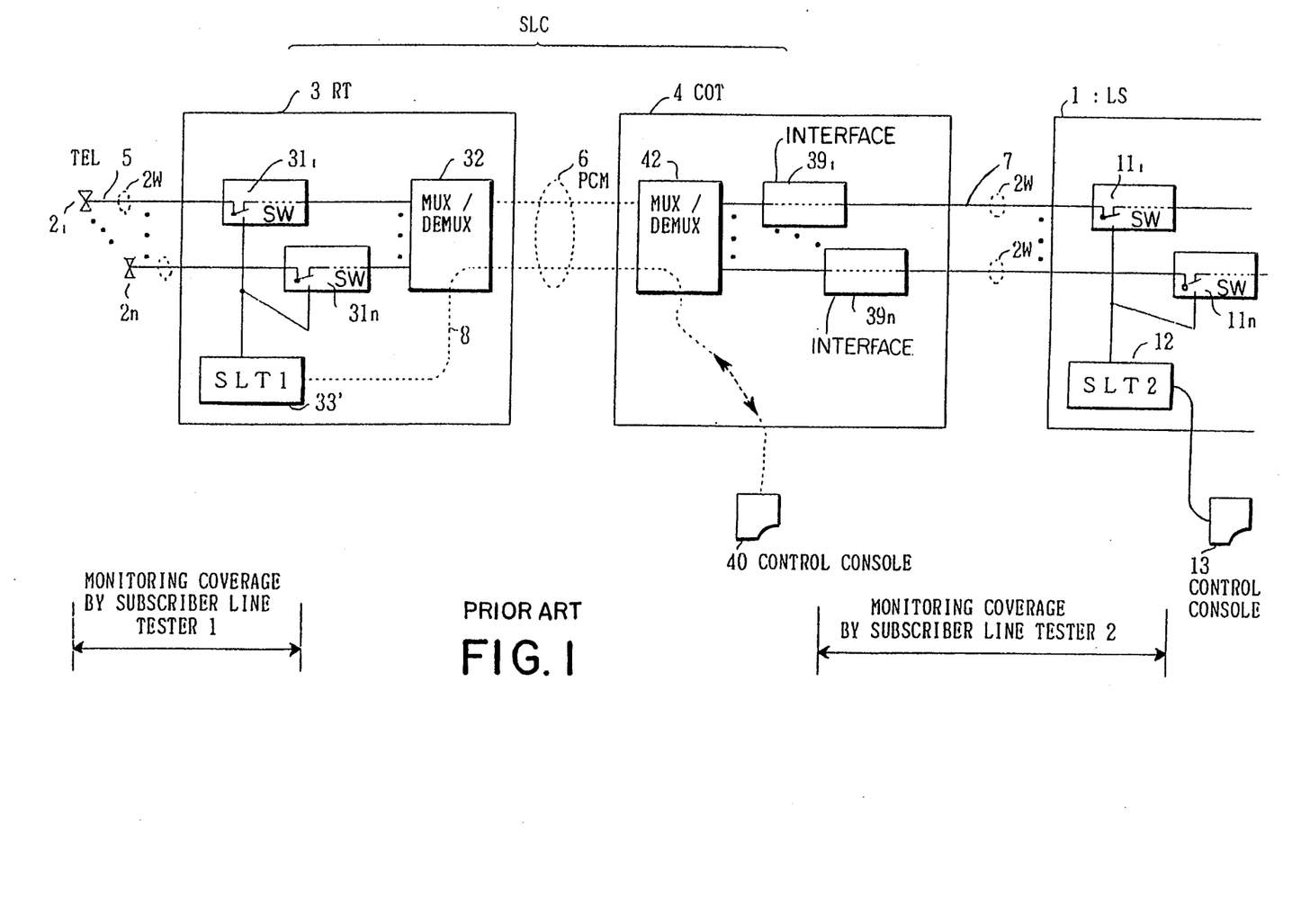
FIG. 1 schematically illustrates a prior art monitoring system of a subscriber loop carrier system.

Recently a subscriber loop carrier, generally referred to as SCL, has been popularly employed in a telecommunication system in order to economically accommodate the increasing number of subscriber lines to be connected with a local switch LS. A typical circuit configuration of prior art subscriber loop carrier SLC system is schematically illustrated in FIG. 1.

A plurality of subscriber terminals $2_1$ to $2_n$ are connected via respective first subscriber lines 5 each formed of a copper wire pair, denoted with 2W, to a remote terminal, generally referred to as a RT, 3.

RT 3 is provided with a first multiplexer/demultiplexer 32 which multiplexes/demultiplexes signals on first subscriber lines 5 to/from a carrier line 6 typically modulated by a pulse code modulation, generally referred to as PCM. The other end of carrier line 6 is connected to a second multiplexer/demultiplexer 42' provided in a central office terminal 4', generally referred to as a COT. Second multiplexer/demultiplexer 42' demultiplexes/multiplexes the signals on carrier line 6 to/from second subscriber lines 7, the other ends of which are connected to a local switch 1. Each of second subscriber lines 7 is formed of a pair of two wires.

Thus arranged is a subscriber loop carrier SCL between first subscriber lines 5 and local switch 1.

RT 3 is further provided with a first subscriber line tester 33', which is connected via transfer switches $31_1$ to $31_n$ provided between each of first subscriber lines 5 and first multiplexer/demultiplexer 32, where the suffix 1 to n denote the channel numbers. Each of transfer switches $31_1$ to $31_n$ is installed respectively on interface cards, and usually connects each of the first subscriber line 5 to first multiplexer/demultiplexer 32. In testing first subscriber lines 5 one of transfer switches 5 switches one of first subscriber lines $5_n$ to the first subscriber line tester 33'.

First subscriber line tester 33' measures DC (direct current) voltage, AC (alternate current) voltage, insulation resistances as well as capacitances of each subscriber line. These measured values are respectively compared with predetermined specification values shown in FIG. 2 in order to judge whether the subscriber line is below or over the specification values, i.e. normal or faulty.

When a fault is detected by first subscriber line tester 33' a fault signal informing the data of the fault is transmitted from subscriber line tester 33' via a data link line 8 provided in carrier line 5 to a control console 40 provided in COT 4'.

In COT 4', between each second subscriber line $7_n$ and multiplexer/demultiplexer 42' there are provided interface cards 39 for connecting each channel output of multiplexer/demultiplexer 42 to each of second subscriber lines 7. Control console 40 controls via data link line 8 the subscriber line tester 33' in RT 3 to test both the subscriber terminals 2 and the subscriber lines 5 so as to check whether they are normal or faulty.

In local switch 1, there are provided interface cards for connecting each of the second subscriber lines 7 to the subscriber side inputs of local switch 1. On each interface card there is provided a transfer switch $11_1$ to $11_n$. A control console 13 controls a second subscriber line tester 12, which tests each of second subscriber lines 7 by being connected to one of second subscriber lines 7 by transfer switch $11_1$ to $11_n$.

The two subscriber line testers 33' and 12 are thus provided independently from each other, where first control console 40 covers subscriber terminals 2 and first subscriber lines 5, as well as second control console 12 covers second subscriber lines 7.

Problem in this prior art SCL monitor system is in that in order to check the status of the overall subscriber lines both of the subscriber line testers 33' and 12 have to be operated to test the respective coverage, resulting in troublesome manual operations. Control console 13 in local switch 1 can identify second subscriber lines 7 with subscriber's telephone numbers; however, control console 40 in subscriber loop carrier SLC must identify the first subscriber lines 5 with channel numbers. Therefore, in testing the first subscriber lines the channel number must correspond with the respective telephone number, resulting in a cause of troublesome procedure.

SUMMARY OF THE INVENTION

It is a general object of the invention to provide a central monitoring system which can monitor at a local switch the status of the first subscriber lines connecting subscriber terminals to the subscriber loop carrier, the status of subscriber loop carrier itself, and the status of the second subscriber lines connecting the subscriber loop carrier to the local switch, with only a small addition of inexpensive components to the conventionally existing system.

In a central monitoring system of a multiplex subscriber loop carrier connecting a plurality of first subscriber lines respectively connected with subscriber terminals and a plurality of second subscriber lines connected to a local switch (LS) switching the second subscriber lines, the multiplex subscriber loop carrier (SLC) comprises the following items. A remote terminal (RT) for multiplexing/demultiplexing the first subscriber lines to/from a carrier line carrying a plurality of channels. The remote terminal comprises a first subscriber line tester (SLT1) for testing the first subscriber lines so as to detect a fault on the first subscriber line. The first subscriber line tester transmits fault information about the fault. And, a central office terminal (COT) for multiplexing/demultiplexing the second subscriber lines to/from said carrier line. The central office terminal comprises a dummy fault generating circuit for representing the fault. Upon receiving fault information about the fault via the carrier line from the first subscriber line tester, the dummy fault generating circuit is connected via a transfer switch to one of the second subscriber lines which corresponds to the first subscriber line having the fault thereon. The local switch comprises a second subscriber line tester (SLT2) for testing the second subscriber lines. Thus, the second subscriber line tester detects the dummy fault generating circuit as a message informing that the fault is on a first subscriber line that corresponds to the second subscriber line having the dummy fault generating circuit connected thereto.

Plural types of the dummy fault generating circuits representing plural kinds of fault information may be provided and selectively connected according to the type of the fault to the second subscriber line so that the kind of fault information can be detected in local switch 5 by the second subscriber line tester.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 4($a$ to $4e$) are schematically illustrates a variation of the dummy fault generating circuit as a second preferred embodiment of the present invention;

FIG. 5($a$ to $5b$) are schematically illustrates a second variation of the dummy fault generating circuit as a third preferred embodiment of the present invention;

DESCRIPTION OF THE PREFERRED EMBODIMENT

Figure 3:
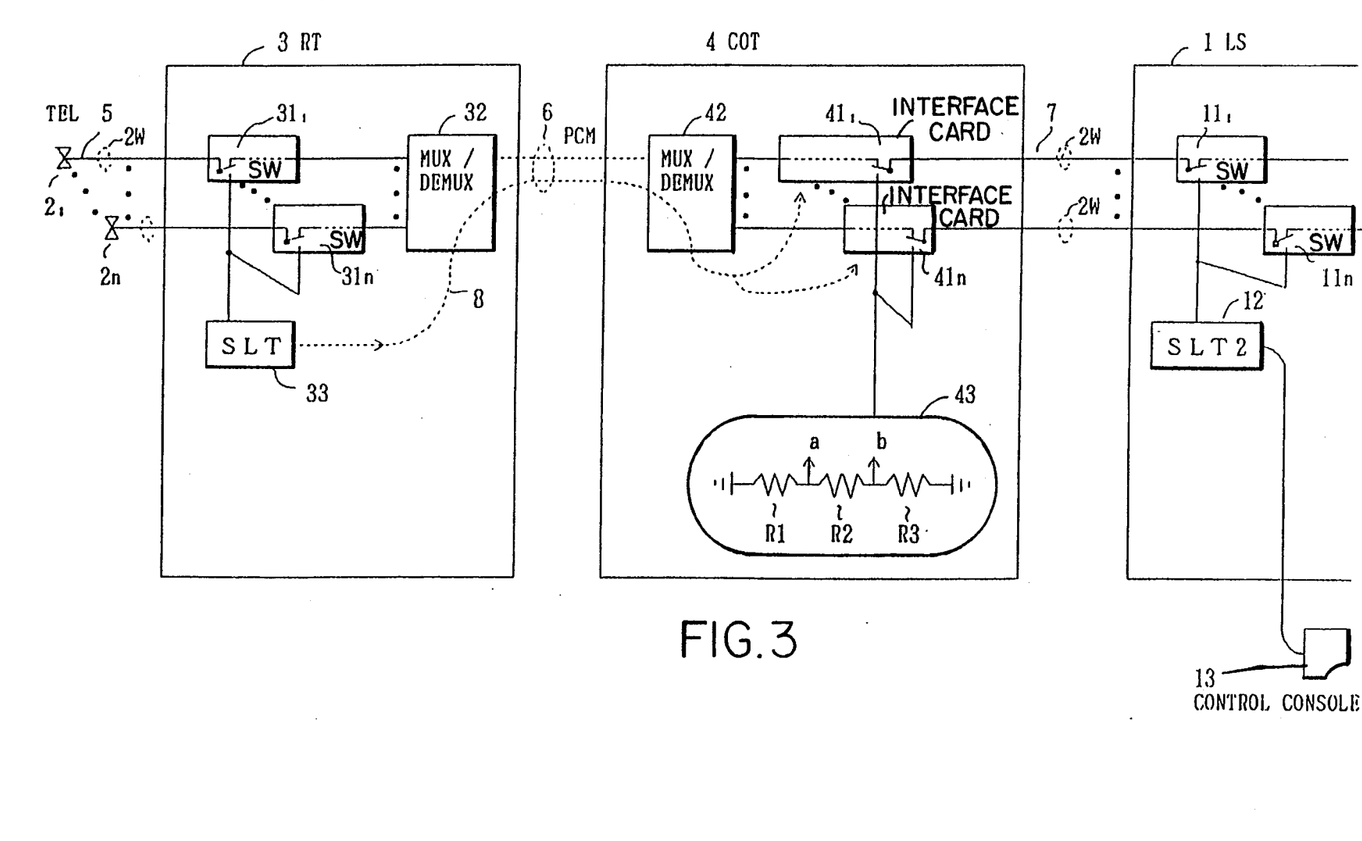
FIG. 3 illustrates a first preferred embodiment of the present invention.

Referring to FIG. 3 a first preferred embodiment of the present invention is hereinafter described in detail. The same parts are denoted with the same numerals.

A plurality of subscriber terminals $2_1$ to $2_n$ are connected via respective first subscriber lines $5_1$ to $5_n$ to a remote terminal 3, referred hereinafter to as a RT. Each of first subscriber line is formed of two copper wires "a" and "b", the pair of which is denoted with 2W in the figure.

RT 3 is provided with a first multiplexer/demultiplexer 32 which multiplexes/demultiplexes signals on the first subscriber lines 5 to/from a carrier line 6 typically modulated by a pulse code modulation, referred to hereinafter as PCM. Another end of carrier line 6 is connected to a second multiplexer/demultiplexer 42 provided in a central office terminal 4, referred to hereinafter as a COT. The second multiplexer/demultiplexer 42 demultiplexes/multiplexes the PCM signals on carrier line 6 to/from second subscriber lines $7_1$ to $7_n$, the other ends of which are connected to a central office switch 1.

Thus, a subscriber loop carrier SLC is arranged between first subscriber lines 5 and local switch 1.

RT 3 is further provided with a first subscriber line tester 33, which is connected via transfer switches $31_1$ to $31_n$ provided between each of the first subscriber lines 5 and first multiplexer/demultiplexer 32, where each suffix 1 to n denotes the channel number. Each of transfer switches $31_1$ to $31_n$ is installed respectively on interface cards, and usually connects each of the first subscriber lines 5 to first multiplexer/demultiplexer 32. In testing first subscriber lines 5 one of transfer switches 5 is turned to connect one of first subscriber lines 5 to the first subscriber line tester 33. Then, a battery feed provided in RT is disconnected by transfer switch 31 from first subscriber line.

Figure 2:
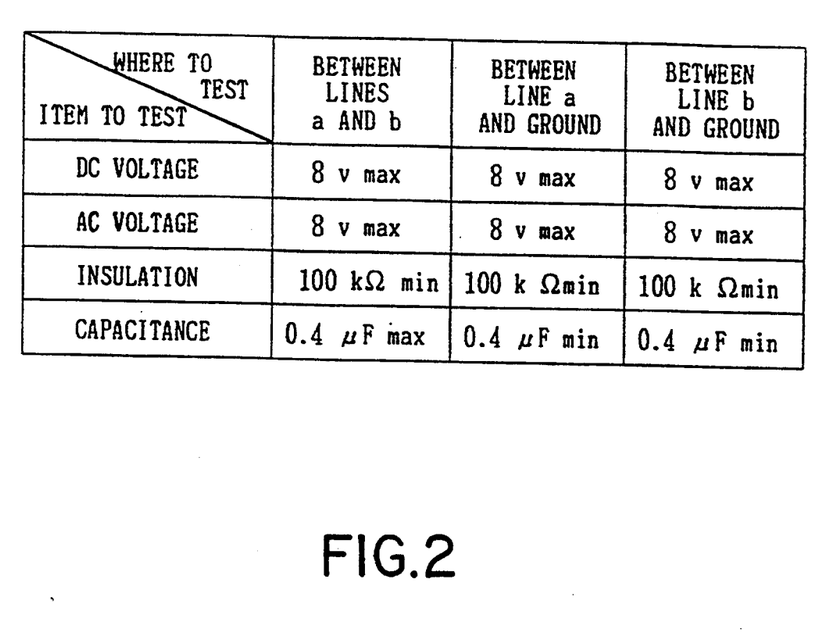
FIG. 2 shows specifications of the subscriber line test.

First subscriber line tester (SLT1) 33 thus scans via the transfer switches $31_1$ to $31_n$ each of first subscriber lines 5 by a predetermined interval so as to measure DC voltage, AC voltage component, insulation resistances as well as capacitances of each subscriber line. These measured values are respectively compared with predetermined specification values in order to judge whether a fault is taking place or not. Typical specification of normal states for the first subscriber line tester 33 is shown in FIG. 2.

In COT 4, between each second subscriber line 7 and multiplexer/demultiplexer 42 there are provided interface cards for connecting each channel output of multiplexer/demultiplexer 42 to each of second subscriber lines 7. On each interface card there is provided a transfer switch $41_1$ to $41_n$, which usually connect second subscriber line to local switch 1. There is further provided according to the present invention a dummy fault generating circuit 43, which is a circuit to simulate the fault taking place in first subscriber line 5. Function and details of dummy fault generating circuit 43 will be described later.

In local switch 1, between each of the second subscriber lines 7 and the subscriber side outputs of local switch 1 there are provided interface cards. On each interface card there is provided a transfer switch $11_1$ to $11_n$, which usually connect second subscriber line to local switch 1. A control console 13 controls a second subscriber line tester 12. Second subscriber line tester (SLT2) 12 tests the status of each second subscriber line 7 via one of transfer switch $11_1$ to $11_n$ turned to one of second subscriber lines 7.

When a fault is detected by first subscriber line tester 33 a fault signal informing the data of the fault, i.e. the number of subscriber line, the measured values in the specification, is transmitted from subscriber line tester 33 via first multiplexer/demultiplexer 32 and a data link line 8 provided in carrier line 5 to second multiplexer/demultiplexer 42. The fault signal on data link line 8 is carried by control bit, typically spare bits, in frame alignment of the PCM of carrier line 6. Upon receiving this information second multiplexer/demultiplexer 42 instructs dummy fault generating circuit 43 to select a dummy circuit that represents the existent fault, and concurrently instructs one transfer switch 41 corresponding to the faulty first subscriber line to turn to dummy fault generating circuit 43.

In FIG. 3 dummy fault generating circuit 43 is composed of three resistors $R_1$ to $R_3$, where two nodes, between respectively $R_1$ and $R_2$, and $R_2$ to $R_3$, are connected each to line "a" and "b" (not shown individually in FIG. 3) of the paired two-wire 2W of second subscriber line 7. Resistance values of the resistors are, for example, 2 k$\Omega$, 1 k$\Omega$ and 3 k$\Omega$, respectively in the above order. These values are so less than those of practical faulty subscriber lines that second subscriber line tester 13 can recognize that thus detected state is a message informing that a fault is occurring on thus identified subscriber line.

Then, second subscriber line tester 12 periodically scanning each of second subscriber line 7 detects via second subscriber line 7 the resistance values of resistors $R_1$ to $R_3$ so as to know that the insulation of this particular one of second subscriber line 7 is faulty. This three resistor circuit 43 may also be employed to represent even the case where the fault at the subscriber line is of other mode, such as a DC power source failure, than the insulation deterioration. Accordingly, in this arrangement second subscriber line tester 12 can only find which of first subscriber lines is faulty.

Thus, the present invention described in the first preferred embodiment allows the local switch to receive the fault alarm of the faulty first subscriber line directly from the first subscriber line tester without operating control console 40 required in the prior art COT.

Referring to FIGS. 4, variations of the dummy fault generating circuits are hereinafter described as second preferred embodiments of the present invention.

Figure 4A:
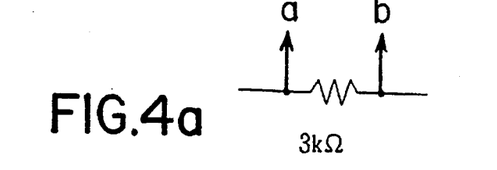

The circuit shown in FIG. 4a having a 3 k$\Omega$ resistor that is lower than the specification, 100 k$\Omega$, given in FIG. 3 represents the deterioration of insulation between the two wires "a" and "b" but the two lines and the terminal telephone set are not short-circuited while the insulations between the two wires and ground are normal. Generally, each of lines "a" and "b" has resistance value less than 1 k$\Omega$, respectively. If the telephone terminal is short, the resistance of the two lines must be lower than 2 k$\Omega$. Therefore, 3 k$\Omega$ of FIG. 4a indicates, i.e. equivalently transmits, a message that some other fault than the shorted telephone terminal has occurred.

Figure 4B:
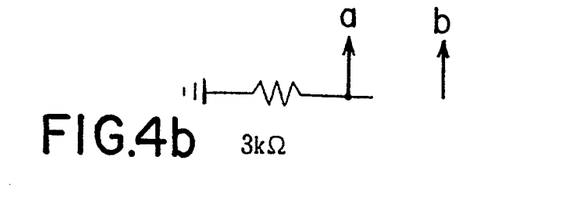

FIG. 4b circuit transmits in the similar way a message such as insulation deterioration between line "a" and ground, an no fault on line "b".

Figure 4C:
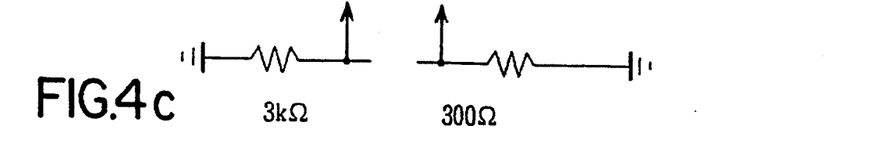

As for FIG. 4c circuit, it is practically very rare that both lines "a" and "b" are concurrently grounded at different places as represented with such an unbalanced combination of a 3 k$\Omega$ resistor connected between "a" line and ground and by a 300 $\Omega$ resistor connected between line "b" and ground. Therefore, thus given combination of the resistance values can be a message to typically inform that an insulation deterioration fault other than a grounding of two wires at a same place has occurred.

Figure 4D:
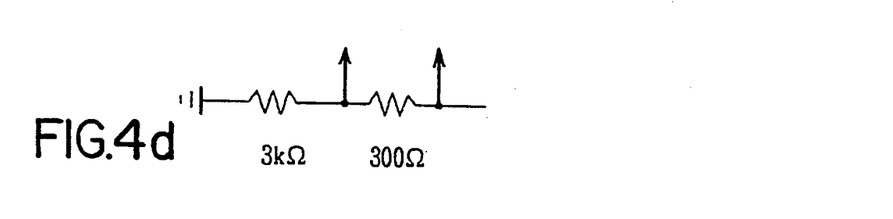
Figure 4E:
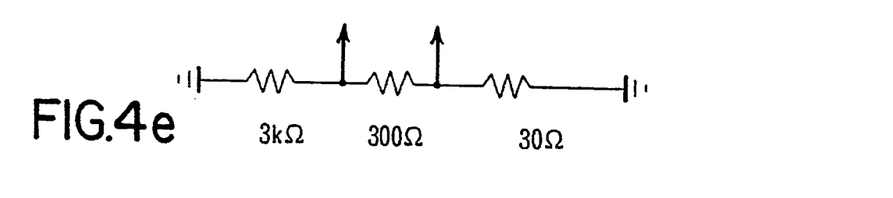

In the similar way as FIG. 4c circuit, the FIG. 4d circuit having a 3 k$\Omega$ resistor connected between "a" line and ground and a 300 $\Omega$ resistor connected between lines "a" and "b", and the FIG. 4e circuits having a 3 k$\Omega$ resistor connected between "a" line and ground, a 300 $\Omega$ resistor connected between lines "a" and "b", and a 30 $\Omega$ resistor connected between "b" line and ground, can be messages based on a promise, i.e. a code, respectively arranged beforehand to inform that other insulation deterioration fault than a grounding of two wires at a same place has occurred. The 30 $\Omega$ resistor may of course be utilized to code a short circuit.

Figure 5A:
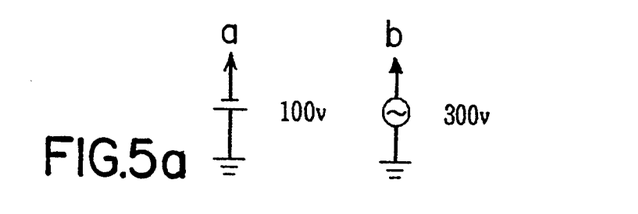
Figure 5B:
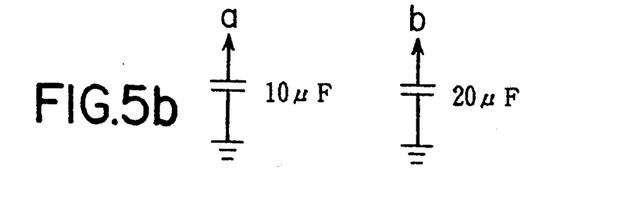

Referring to FIGS. 5, other variations of the dummy fault generating circuits are hereinafter described as third preferred embodiments of the present invention.

The circuit shown in FIG. 5a has between line "a" and ground a 100V battery, voltage of which has been chosen higher than the specification limit 8V shown in FIG. 3 and moreover higher than a maximum battery feed voltage 66V, as well as 300V AC (alternate current) voltage higher than the specification limit 8V AC and moreover higher than the commercial power line voltage 240V AC. The DC 100V can indicate a touch of other DC power supply. The AC 300V can indicate a power exposure, i.e. a touch of a commercial power supply to the subscriber line.

The circuit shown in FIG. 5b has between line "a" and ground a 10 $\mu$F capacitor, which is much higher than the maximum limit 2 $\mu$F of the telephone terminal, as well as a 20 $\mu$F capacitor between line "b" and ground. Thus unbalanced capacitors can be a message to inform some particular fault according to a code arranged beforehand.

Figure 6:
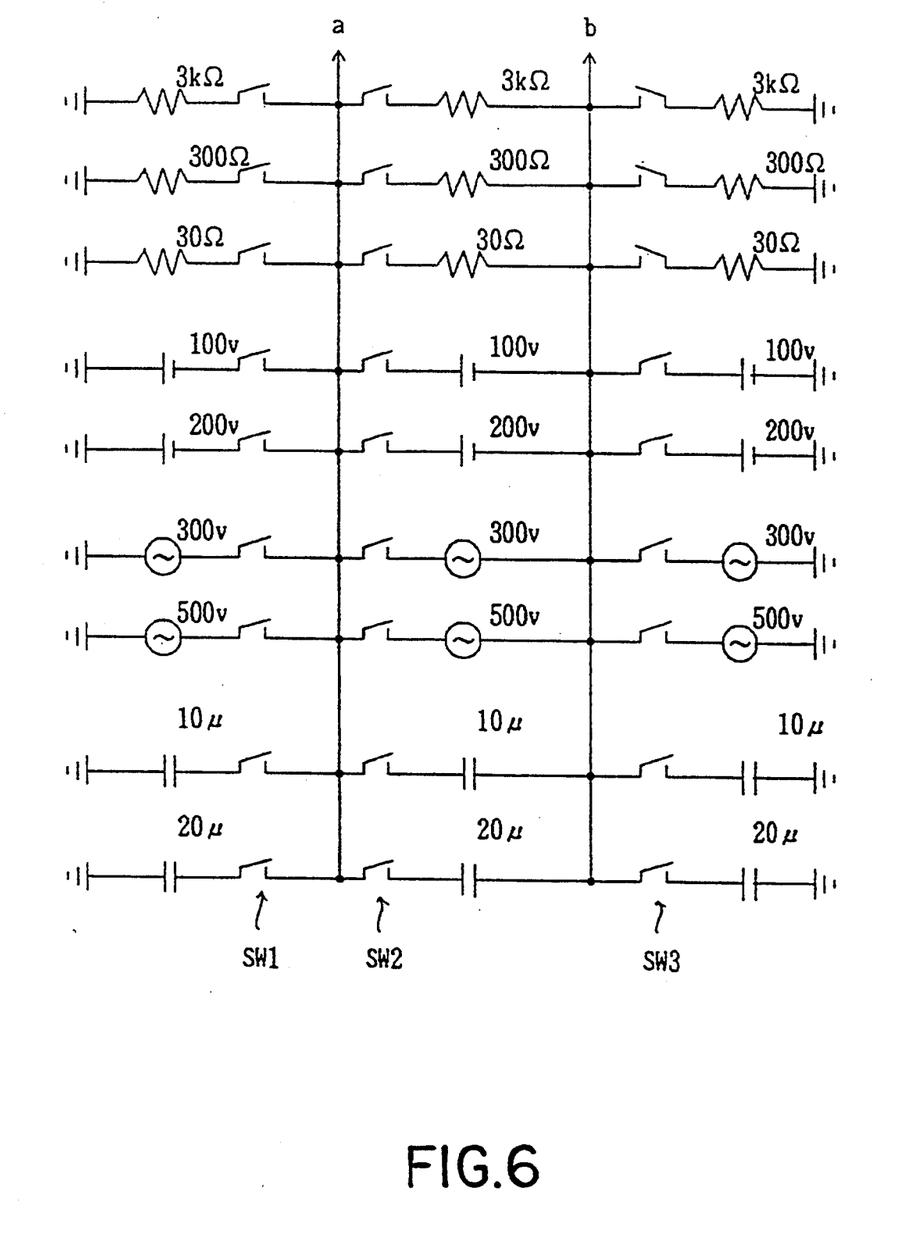
FIG. 6 schematically illustrates a third variation of the dummy fault generating circuit as a third preferred embodiment of the present invention.

Referring to FIG. 6, another variation of the dummy fault generating circuits are hereinafter described as a fourth preferred embodiment of the present invention. The FIG. 6 circuit is a summary of the above preferred embodiments, where each of the circuit elements, such as resistors, capacitors, DC voltage sources, AC voltage sources and an open circuit, can be selectively connected by switches SW1 between line "a" and ground, by switches SW2 between lines "a" and "b", and by switches SW3 between line "b" and ground.

Thus, the dummy fault generating circuit can either simulate the mode of fault, that is where, what kind of, and how much degree of, the fault is. Moreover, the dummy generating circuit can represent many types of the faults by means of the combination created by selectively operating the switches SW1, SW2 and SW3. As described above, the faults information represented by the combination in the dummy fault generating circuit must be predetermined as the promises, i.e. codes, between first subscriber line tester 33, dummy fault generator 43 and second subscriber line tester 12.

The number of the provided dummy fault generating circuit 43, 44, 49 or that of FIG. 6 may be either equal to or less than the channel number, and is determined so as to meet the number of channels that may happen to be concurrently faulty.

Figure 7:
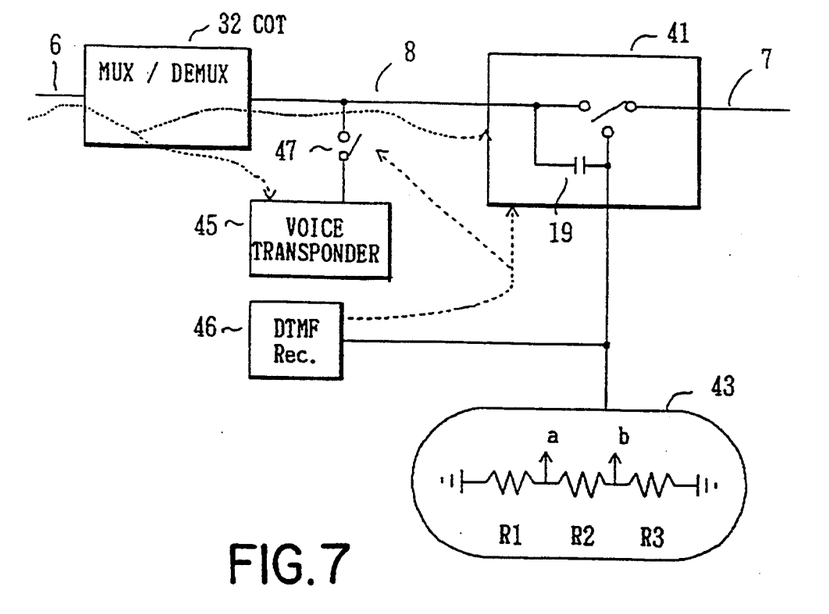
FIG. 7 schematically illustrates a variation of the monitoring system as a third preferred embodiment of the present invention.

Referring to FIG. 7, as a fifth preferred embodiment of the present invention a circuit configuration for a single channel is hereinafter described in detail. In COT 4 of FIG. 7 there are provided dummy fault generating circuit 43 which has three resistors $R_1$ to $R_3$ as employed in the FIG. 2 first preferred embodiment, a voice transponder 45 and a dual-tone multi-frequency dial signal receiver (referred to hereinafter as a DTMF receiver) 46, a switch 47 for connecting voice transponder 45 to subscriber line 8 connecting between second multiplexer/demultiplexer 42 and transfer switch 41, and a capacitor 17 provided between subscriber line 8 and dummy fault generating circuit 43. Voice transponder 45 is provided with a memory device which stores voice signals to tell types and degrees of many kinds of the faults.

The fault information detected by first subscriber line tester 33 is input via data link line 8 and second multiplexer/demultiplexer 42 to transfer switch 41, dummy fault generating circuit 43 and voice transponder 45. Functions of transfer switch 41 and dummy fault generating circuit 43 are the same as those of the first preferred embodiment, where local switch 1 can only identify the faulty subscriber line number. When local switch 1 thus identifies the fault on a particular one of first subscriber lines 5, control console 13 in local switch 1 dials this line. Upon receiving the dial signal of this call DTMF receiver 46 actuates switch 47 to be closed.

Now, second subscriber line tester 12 in local switch 1 can test the second subscriber line 7 and 8 which is free from the dummy fault generating circuit 43.

Then, if local switch wants more test or more information about the first subscriber line 5 control board 13 of local switch 1 sends an instruction by means of dial signal via second subscriber line 7 and capacitor 19 to DTMF receiver 46. For example, dial tone "0" instructs that all the transfer switches 41₁ to 41ₙ be turned to dummy fault generating circuit. Dial tone "1" instructs that only the transfer switch connected to the faulty first subscriber line be turned to subscriber line 8. Dial tone "9" instructs switch 47 to be closed; and so on. When switch 47 is closed voice transponder 45 transmits to local switch 1 a voice signal informing the detail of the fault according to fault information having been received from the first subscriber line tester 33.

Thus, both the first subscriber line and the second subscriber line can be directly tested from the local switch.

Figure 8:
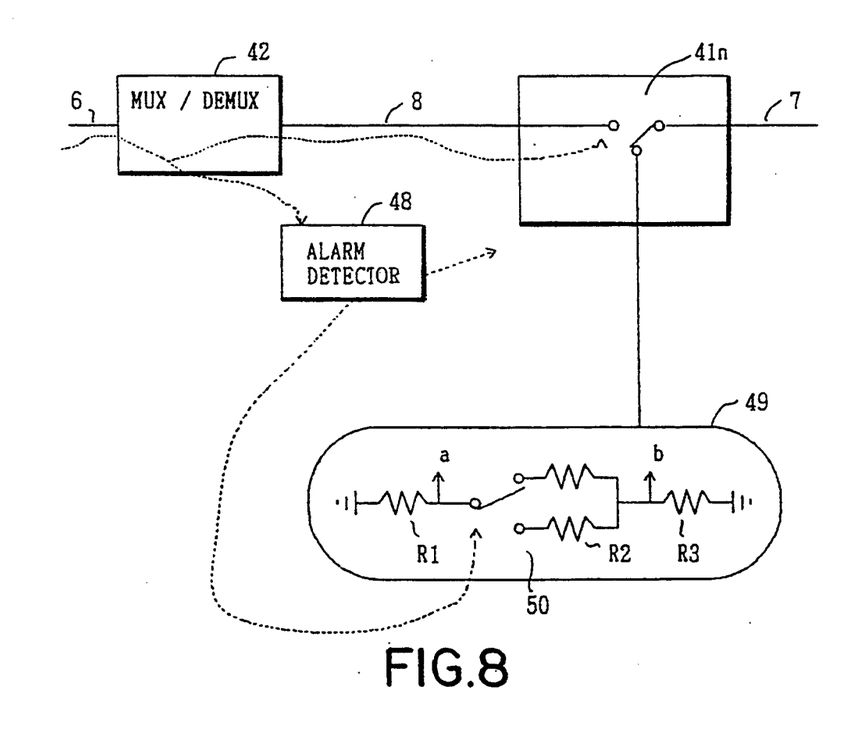
FIG. 8 schematically illustrates a variation of the monitoring system as a fourth preferred embodiment of the present invention.

Referring to FIG. 8, as a fifth preferred embodiment a circuit configuration of that can represent detail of the fault generated in the subscriber loop carrier is hereinafter described in detail. In COT 4 of FIG. 8, there are provided a dummy fault generating circuit 49 which includes two kind of resistor net work, and an alarm detector 48 which receives an alarm caused from a fault generated in the subscriber loop carrier, that is, first multiplexer/demultiplexer 32, carrier line 6 and second multiplexer/demultiplexer 42.

Upon receiving the alarm informing a fault on a first subscriber line 5n as in the prior preferred embodiments, the alarm detector 48 turns a transfer switch 41n corresponding to the faulty subscriber line 5n, and then outputs a first output signal informing of the fault in first subscriber line 5 to dummy fault generating circuit 49.

Moreover, upon receiving the alarm informing a fault caused in the subscriber loop carrier, the alarm detector 48 instructs all of transfer switches 41 to turn to the dummy fault generating circuit 49, and then outputs a second output signal to dummy fault generating circuit 49. The reason why in the latter case all the transfer switches 41 are switched is that the fault in the subscriber loop carrier generally causes a damage on all the channels. In dummy fault generating circuit 49 the first network indicating the fault in first subscriber line 5 and the second network indicating a fault in the subscriber loop carrier are switchable by a switch 50. The first output signal from alarm detector 48 selects via switch 50 the first network, as well as the second output signal selects the second network.

Thus, the network that indicates where the fault has occurred is connected to second subscriber line 7. Then, in local switch 1 first subscriber line tester 12, which is periodically monitoring second subscriber line 7, can detect thus connected network informing where the fault has occurred, i,e, in the subscriber lines or in the multiplex subscriber loop carrier.

Though in the fifth preferred embodiment one of the networks is provided to represent the fault in the subscriber loop carrier, it is apparent that a plural number of the networks may be provided so that each of which can represent the type of the fault on the subscriber loop carrier.

According to the present invention, in the local switch the central monitoring can be accomplished with second subscriber line tester 12 for both the first subscriber lines (between the subscriber terminals and the RT), and the second subscriber lines (between the COT and local switch), moreover, the central monitoring of the subscriber loop carrier can be accomplished, with a minimum addition of components to the conventionally existing telephone transmission system.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What I claim is:

1. A central monitoring system of a multiplex subscriber loop carrier connecting a plurality of first subscriber lines respectively connected with subscriber terminals and a plurality of second subscriber lines connected to a local switch for switching the second subscriber lines, the multiplex subscriber loop carrier (SLC) comprising:

a remote terminal (RT) including means for multiplexing/demultiplexing the first subscriber lines to and from a carrier line carrying a plurality of channels, and a first subscriber line tester (SLT1) operatively connected to the first subscriber lines for testing the first subscriber lines so as to detect a fault on one of the first subscriber lines, said first subscriber line tester transmitting fault information on said fault; and a central office terminal (COT) including means for multiplexing/demultiplexing the second subscriber lines to and from said carrier line, and a dummy fault generating circuit for representing said fault, upon receiving fault information on said fault via said carrier line from said first subscriber line tester, said dummy fault generating circuit being connected via a transfer switch to one of the second subscriber lines that corresponds to said first subscriber line having said fault thereon, the local switch comprising a second subscriber line tester (SLT2) for testing said second subscriber lines, said second subscriber line tester detecting said dummy fault generating circuit so as to provide a message informing that said fault is on said first subscriber line which corresponds to said second subscriber line having said dummy fault generating circuit connected thereto.

2. A central monitoring system of a multiplex subscriber loop carrier as recited in claim 1, wherein said dummy fault generating circuit comprises a plurality of circuit configurations, each said circuit configuration corresponding to a type of said fault, and further comprising means which, depending on said fault information, selectively connects one of said circuit configurations to said second subscriber line which corresponds to said first subscriber line having said fault thereon.

3. A central monitoring system of a multiplex subscriber loop carrier as recited in claim 1, wherein at least one of said remote terminal and said central office terminal further comprises a voice transponder operatively connected to said multiplexing/demultiplexing means thereof, for receiving said fault information and transmitting a voice signal informing of said fault in response to a request call from said local switch to said second subscriber line which corresponds to said first subscriber line having said fault thereon.

4. A central monitoring system of a multiplex subscriber loop carrier as recited in claim 1, wherein said central office terminal inhibits said dummy fault generating circuit from being connected to said second subscriber line that corresponds to said first subscriber line having said fault thereon, upon receiving a request from said local switch.

5. A central monitoring system of a multiplex subscriber loop carrier as recited in claim 2, wherein one of said circuit configurations represents a fault generated in the multiplex subscriber loop carrier.

6. A central monitoring system of a multiplex subscriber loop carrier as recited in claim 5, wherein said one of said circuit configurations representing said fault generated in the multiplex subscriber loop carrier is connected to all of said second subscriber lines when said fault is detected.

* * * * *